United States Patent [19]

Blais

[11] Patent Number: 5,382,064
[45] Date of Patent: Jan. 17, 1995

[54] GAME DRAG

[76] Inventor: Sam L. Blais, 4102 MacArthur Rd., Muskegon, Mich. 49442

[21] Appl. No.: 753,828

[22] Filed: Sep. 3, 1991

[51] Int. Cl.6 .......................... A01M 31/00; B65G 7/12
[52] U.S. Cl. ....................................... 294/26; 294/169
[58] Field of Search ................... 294/15, 17, 19.3, 26, 294/137, 169, 170; 119/151, 152

[56] References Cited

U.S. PATENT DOCUMENTS

| | | | |
|---|---|---|---|
| 338,885 | 3/1886 | Stockinger | 294/26 |
| 901,057 | 10/1908 | Autenrieth | 294/26 |
| 1,640,102 | 8/1927 | Valliere | 294/26 |
| 1,967,560 | 7/1934 | Oberg | 294/169 |
| 3,282,619 | 11/1966 | Loosemore | 294/15 |
| 4,364,592 | 12/1982 | Jackson | 294/26 |
| 4,717,187 | 1/1988 | Delgado, Jr. | 294/17 |
| 5,029,921 | 7/1991 | Houghton et al. | 294/26 |

Primary Examiner—Dean J. Kramer
Attorney, Agent, or Firm—John A. Waters

[57] ABSTRACT

A handle member, providing a hand gripping section connected to a linking section, is coupled to a hook member, providing a shank region and a point-bearing region such that the hook member may overlay the handle member in a pocket-sized storage or carrying arrangement, said handle member shielding a point of said hook member from accidental engagement with the user in said carrying arrangement. Several shapes of handle members include triangular, hexagonal, rectangular, trapezoidal, or elliptical. Several configurations or hook members include an angularly offset, transverse point-bearing region, a substantially linear shank merging with an arcuate point-bearing region, or a hook member having a plurality of linear segments each angularly offset from adjacent segments. The hook member may be linked directly to the handle member by a loop formed on the shank of the hook member engaging with the linking region of the handle member, or it may be coupled to the handle member by a length of cable, rope, or chain. A swivel link may also be used for coupling the hook member to the handle member. Multiple embodiments are formed by combination of a selected handle member with a selected hook member, coupled together by a selected coupling approach.

23 Claims, 2 Drawing Sheets

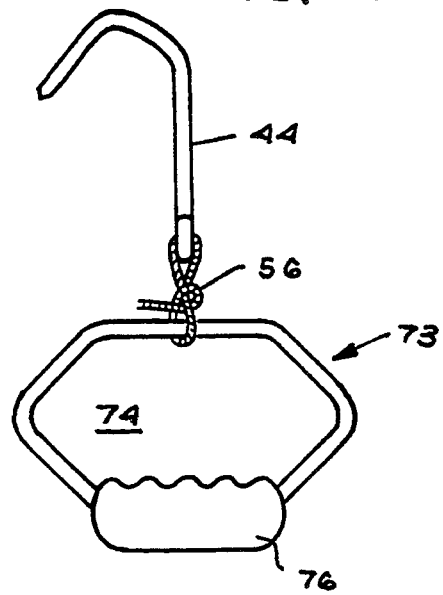
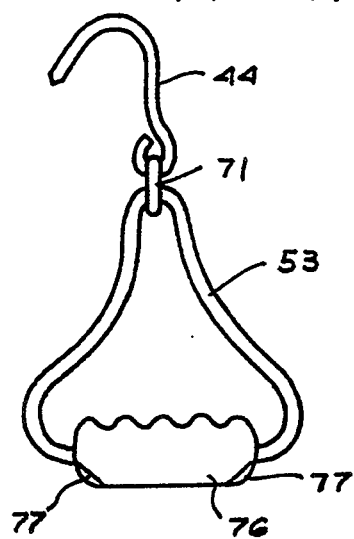
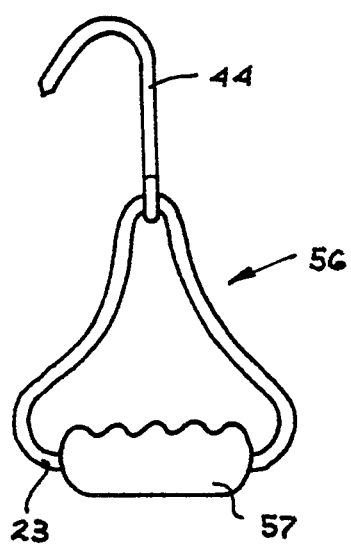
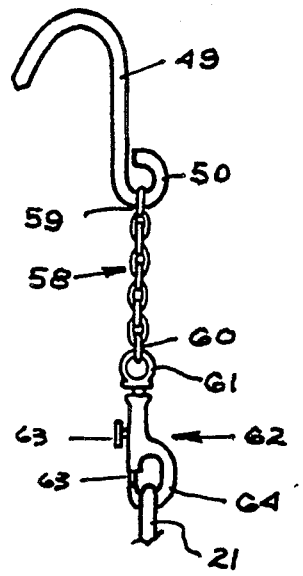
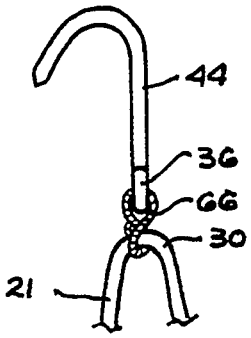

GAME DRAG

BACKGROUND OF THE INVENTION

1. Field of the Invention

The present invention relates to sporting goods products, and more particularly to an accessory useful by hunters and anglers for retaining and transporting taken game.

2. Description of the Prior Art

While no specific prior art relating to the present invention is presently known to the inventor, hunters, particularly of larger animals such as deer and the like, are universally faced with the problem of transporting their prey, usually taken in a relatively remote location, to a location whereat mechanical transportation is available, or whereat the taken animal may be dressed out. Heretofore, such hunters have relied upon relatively simple means for transporting their prey. The simplest of such approaches is for the hunter to physically lift the prey onto their shoulders into a carrying position. However, such a practice may be significantly hazardous, since other hunters may identify the carried carcass as a viable target, placing the carrying hunter in jeopardy of being shot.

Another commonly used approach is to secure a length of rope or cable to appropriate portions of the anatomy of the dead animal, and to then use the rope to pull the dead animal along the terrain surface. The general flexibility of rope, however, gives rise to a measure of difficulty in making a continuous pulling effort, particularly over terrain having significant natural obstacles such as growth, deadfalls, outcroppings, and the like. When such an obstacle is encountered, the transporting hunter usually finds it necessary to pause in the pulling effort, approach the carcass, and physically lift the carcass, or a major portion thereof, over or around the obstacle before resuming the pulling effort.

It is also know that devices principally devised for use in other fields of endeavor have been modified or otherwise adapted for use as game drag implements. Meathooks, commonly used in the meat processing industry, provide a pointed hook that can be forced into engagement with an appropriate portion of the anatomy of the dead game. Such meathooks are usually provided with a handle, generally in the form of a rigid bar rigidly attached to the hook at right angles with the extent of a shank of the hook portion. Thus, a user may grasp the handle of the meathook and drag the prey along behind him or her. Similarly, some hunters have taken hay bale hooks, generally used for manually lifting hay bales from the ground to a hayrack, for the purpose of dragging dead game. Such hay bale hooks usually have the same general appearance as a meathook, with size of the hook and the length of the shank being the primary differences between the two types of implements. Another similar implement is often used by stevedores or other cargo handlers for moving and loading boxes and crates.

Less frequently, some hunters have adapted an implement similar to the large ice tongs once commonly used for handling large blocks of ice. Such ice tongs generally have a pair of opposed points, respectively on individual shanks that are provided with handles at their obverse ends, the shanks are pivoted, in a substantially scissors-like manner near the midpoints of their respective extents. When used as a game drag, such a device holds the game between the two points.

Such devices, as are heretofore commonly adapted for use as a game drag, each provide some measure of rigidity to enable the user to at least partially lift the attached portion of the dead animal over terrain obstacles with minimal pause in the pulling effort. However, each such device suffers from considerable bulk, which results in significant difficulty in carrying the device prior to the time it is needed for use. Additionally, the rigidity of construction of such devices often places the points of a carried device in positions wherein significant potential risk arises that the points may engage with the carrying user to cause injury to the user.

SUMMARY OF THE INVENTION

Accordingly, an object of the present invention is to provide a game drag device having a hook member for engagement with an appropriate portion of the anatomy of a game animal, and a handle member which may be readily grasped by a user, said device being capable of assuming a storage arrangement wherein a point of the hook member is substantially sheltered from accidental engagement with the user.

Another object of the present invention is to provide a game drag device wherein the hook member folds over the handle member, and seats proximately therewith, for storage and for safety during carrying of the device in or on user worn clothing.

An additional object of the present invention is to provide a game drag device wherein the folded storage capability is provided by a loop formed on an end of a shank portion of the hook member acting freely about a pivot-engaging portion of the handle member.

A further object of the present invention is to provide a game drag device wherein the folded storage capability is, in the alternative, provided by a universal pivot mechanism coupling the hook member to the handle member.

It is also an object of the present invention to provide a game drag device wherein the hook member is, in the alternative, coupled to the handle member by a short length of cable or chain.

It is another object of the present invention to provide a game drag device wherein the handle member is configured to enclose a generally isosceles triangular planar area or, in an alternative, a generally circular area, said handle member also providing a comfortable gripping portion to a user.

It is an additional object of the present invention to provide a game drag device wherein the handle member is, in further alternatives, configured to enclose any other conveniently shaped planar area.

It is a further object of the present invention to provide a game drag device that is durable, light weight, safe during carrying, readily usable, and inexpensive to fabricate.

Yet another object of the present invention is to provide a game drag device that is suitable for alternative uses in pulling slain deer and similar game animals, game fish, and/or game fowl.

These, and other objects, features, and advantages of the present invention that may be described in or suggested by the subsequent descriptions and claims, are provided by a game drag device consisting of a hook member and a handle member cooperatingly coupled together to enable deployment into at least an extended use arrangement, and into a folded, storage or carrying arrangement. The hook member is generally fabricated from a rigid, durable, rod-like material having a generally circular cross-section, although other cross-sectional areas are envisioned. The rod-like material, in a first embodiment, has a loop formed at one end of the rod, adapted to engage with the handle member in a manner to be clarified hereinbelow, and a point, not necessarily acute, formed at the obverse end of the rod. Intermediate between the loop and the point, the rod-like material of the hook member is bent to generally assume a shape providing a shank portion, extending radially outwardly from the loop, an offset bend central portion, and a point-bearing portion bent to extend substantially orthogonally with respect to the general extent of the hook member. The bend merging the central portion with the shank portion, and the bend merging the central portion with the point-bearing portion, are respectively formed such that an imaginary line extending axially along the extent of the shank portion, and continuing toward the point-bearing portion, intercepts the point-bearing portion substantially at the midpoint of the extent of the point-bearing portion, or generally more proximate to the point.

Other bending configurations of the hook member are envisioned, such as forming the point-bearing portion to be arcuate along its extent in a manner directing the point at least partially toward the shank portion end of the hook member, or such as introducing additional bends along the central portion or along the extent of the point-bearing portion. In general, all such envisioned configurations of the hook member provide the characteristic that, with the point-bearing portion appropriately engaged with a game animal, a pulling force exerted upon the shank portion in a direction substantially parallel to the extent of the shank portion and away from the point-bearing portion will not cause the point-bearing portion to tend to become disengaged from the dead animal carried thereon.

The handle member is also generally fabricated from a rigid, durable, rod-like material having a generally circular cross-section. Again, other rod-like structures of non-circular cross-section are alternate embodiments. I a preferred embodiment of the handle member, the rod-like material is bent to form a planar figure substantially that of an isosceles triangle, with the apex of the angle between the two equal length sides being formed into a substantially semi-circular shape extending convexly from the area enclosed by the triangle and in the same plane as the area enclosed by the triangle. The opposed ends of the rod-like material area, in the preferred embodiment, fused together to complete the triangular shape. The semi-circular shape portion is adapted to accept the loop formed on the first end of the shank portion of the hook member, which loop is formed to loosely pass around the circumference of the rod-like material of the handle member so as to provide freedom of motion between the hook member and the handle member, yet enabling a force, applied to a base side of the handle member orthogonally to the extent of the base side and in the plane of the enclosed triangle, to be transmitted to the point-bearing portion of the hook member during pulling of the device. The handle member may also be formed, in alternate embodiments, to enclose a substantially circular planar area, to enclose a substantially hexagonal planar area, to enclose a rounded rectangular planar area, or to enclose any one of a number of other planar shapes, each providing an interior enclosed area through which a user may place his or her fingers and palm so as to grip an appropriate portion of the handle member at a location generally circumferentially opposed to the location at which the hook member is coupled to the handle member. A hand grip element may also be formed on the rod-like material or affixed thereto generally in the form of a sleeve.

In other alternate embodiments, a short length of cable or chain or rope is used to span a distance separating otherwise independent hook and handle members, said cable, chain or rope serving as a means for coupling the hook member to the handle member. Snap eye-type fasteners, swivel links, or spring-loaded clip fasteners may be used on either or both ends of the chain, cable, or rope to facilitate attachment of the coupling element to the hook member, or to the handle member, or both, accordingly.

In each of the preferred and alternate embodiments, a primary limiting feature in the fabrication and shape of the hook member and the handle member arises from the provision of a capability to mutually orient the hook member and the handle member from a use arrangement, wherein the hook member is fully extended from the handle member, to a storage or carrying arrangement, wherein the hook member substantially overlays the handle member. In the storage or carrying arrangement, the herein game drag device is constrained to be sufficiently compact to allow a user to carry the device in a clothing pocket. Thus, the configurations of the hook member and the handle member are to be sufficiently compatible so that the point of the hook member is at least partially shielded by portions of the handle member in said carrying arrangement.

While the principal intended use of the herein game drag device is to aid in handling a deer carcass during an operation of dragging the dead animal from the kill site to another desired location, the device may also be used for hanging the carcass during dressing out. Passing an extended rope or other tensile element over an appropriately elevated tree limb or other hoisting support, and then attaching a free end of the rope to the handle member of the present invention, with the hook member remaining engaged with the dead animal, enables a user to pull on the obverse end length of the rope to hoist the dead animal into a handing attitude. Game fish may be carried by passing the point-bearing portion of the hook member through gills of the fish. Game fowl may be carried by penetrating the point-bearing portion of the hook member through appropriate portions of the anatomy of the game fowl.

In addition to the several embodiments described herein or suggested by this specification, it is apparent that numerous variations in the shapes of the component members can be made while retaining the primary features, advantages, and uses of the herein game drag device. Each such further embodiment is envisioned to be within the scope of the present invention. Moreover, the inclusion or omission of a separate or integral handle grip is considered a matter of user choice, with each alternative being within the scope of the present invention. Similarly, a carrying pouch, adapted to enclose the device in its storage or carrying arrangement, may be provided as an adjunct to the present invention.

BRIEF DESCRIPTION OF THE DRAWING

In the drawing, wherein like reference numbers and symbols are used to refer to like components and features throughout:

FIG. 5 is a perspective view of a fourth alternate embodiment of a game drag device in accordance with the present invention;

FIG. 6 is a fragmentary perspective view of a fifth alternate embodiment of a game drag device in accordance with the present invention, showing a first alternate manner of coupling a hook member to a handle member;

FIG. 7 is a fragmentary perspective view of a sixth alternate embodiment of a game drag device in accordance with the present invention, showing a second alternate manner of coupling a hook member to a handle member;

FIG. 10 is a perspective view of a ninth alternate embodiment of a game drag device in accordance with the present invention; and FIG. 11 is a perspective view of a tenth alternate embodiment of a game drag device in accordance with the present invention;

DESCRIPTION OF THE PREFERRED EMBODIMENTS

Figure 1A:
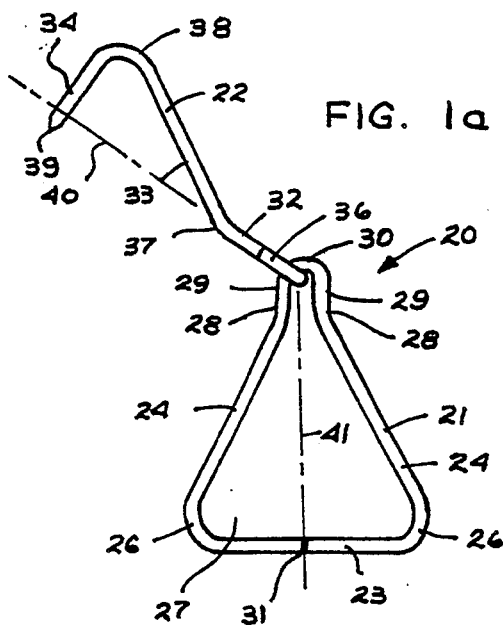
FIG. 1 is a perspective view of a preferred embodiment of a game drag device in accordance with the present invention.
Figure 1B:
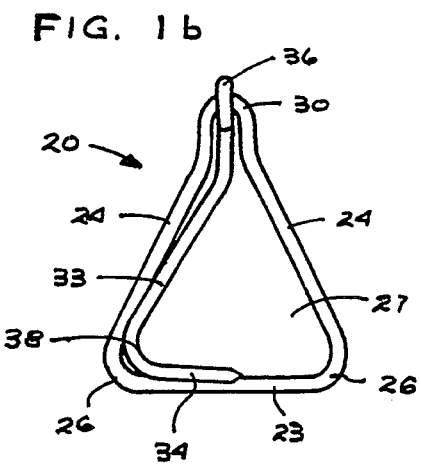

Referring first to FIG. 1, a game drag device in accordance with the present invention is indicated generally at 20. The device 20 is basically comprised of a handle member 21 and a hook member 22, along with means for coupling the hook member 22 to the handle member 21. In the preferred embodiment of the device 20, the hook member 22 is shown to be directly coupled to the handle member 21, as will be more fully described hereinbelow.

The handle member 21 is integrally fabricated from a durable, rigid, rod-like material, such as stainless steel, with the rod appropriately bent to form a substantially isosceles triangular shape comprised of a base leg 23, having a first length, and two substantially mutually equal second length side legs 24. The base leg 23 has an extent, said first length, between merging regions 26 of the base leg 23 with respective corresponding ends of the side legs 24, appropriate to at least accept the span of a hand of a user (not illustrated) grasping said base leg 23 with fingers and palm passing through an open, generally triangular, area 27 bounded by the base leg 23 and the side legs 24. Each of the two side legs 24 has an extent grater than that of the base leg 23. The end portion 28 of each side leg 24 is bent outwardly from, and in the plane of, the area 27, and then into a substantially arcuate region 29 merging contiguously with a mirror image arcuate region 29 of the end portion 28 of the other side leg 24, such that the combination of end portions 28 of the equal length side legs 24 describes a substantially semi-circular arc 30 in the plane of the triangular area 27. Fabrication of the preferred embodiment of the handle member 21 generally comprises bending an appropriate length of rod-like material at approximately the middle of its extent into the semi-circular arc 30, then forming the bends establishing the angular relationship between the two side legs 24, and then forming the bends at the merging regions 26 to establish the opposed free end segments forming the base leg 23. The free end segments of the length of rod-like material are, through the appropriate bending operations described above, then in substantially abutting alignment, the juncture being approximately at a midpoint of the extent of the base leg 23. The free ends may be fused together at 31 to form a continuous base leg 23 free from surface irregularities that would tend to cause injury to a hand grasping the base leg 23.

The hook member 22 is integrally formed from a second length of rod-like material, such as stainless steel, to assume a shape consisting, from a first end of the length of rod-like material, of a shank region 32, a central extent 33, and a point-bearing region 34. The shank region 32 is bent, along the free end portion of the region 32, to form a substantially circular loop 36, wherein a plane of a generally circular substantially enclosed area formed thereby is orthogonal to the plane of the triangular area 27 of the handle member 21. The loop 36 provides an enclosed open area marginally greater than a maximum cross-sectional area of the rod-like material of the semi-circular arc portion 30 of the handle member 21. Said loop 36 is formed around the rod-like material of the handle member 21, passing through the area enclosed by said loop 36, such that said loop 36 may translate along the extent of the rod-like material of the handle member 211, at least within said semi-circular arc 30. The loop 36 is also to be formed so that the area enclosed thereby is free to rotate about a longitudinal axis of the rod-like material of the handle member 21. Alternately, the loop 36 may be formed on the shank region 32 of the hook member 22, and one free end of the rod-like material of the handle member 21 is then passed through the enclosed area within the loop 36 prior to fusing the two free ends of the rod-like material to form the base leg 23 of the handle member 21. Through this alternate fabrication method, the loop 36 is then translated along the extent of the rod-like material of the handle member 21, and around its bends, to reach the semi-circular arc 30. The shank region 32 extends substantially tangentially with respect to the loop 36 to a first bend 37, formed in the plane of the triangular area 27 of the handle member 21, merging thereat with the central extent 33 of the hook member 22. The central extent 33 continues, in the plane of the triangular area 27, to a second bend 38, formed in the plane of the triangular area 27, merging thereat with the point-bearing region 34, which extends substantially in the plane of the triangular area 27 to a free end of the rod-like material forming the hook member 22. The second bend 38 is such that generally an acute angle is included between the central extent 33 and the extent of the point-bearing region 34. The distal free end of the point-bearing region 34 is formed to have a point 39 of sufficient acuteness to readily penetrate appropriate portions of animal anatomy. The first bend 37 and the second bend 38 are further characterized in that an imaginary line 40 may be constructed along the extent of the shank region 32 toward the point-bearing region 34, said imaginary line 40 intersecting the extent of the point-bearing region 34 substantially orthogonally at, or, with respect to said second bend 33, beyond, a midpoint of the extent of the point-bearing region 34.

A further constraint on the fabrication and construction of the handle member 21 and the hook member 22 arises from the intended use of the device 20, wherein the hook member 22 is to substantially overlay the handle member 21 when the device 20 assumes a storage or carrying arrangement thereof, as indicated by a ghost image position of the hook member 22 illustrated in FIG. 1. Thus, the extent of the handle member 21, as determined by the length of an imaginary line 41 constructed from the apex of the semi-circular arc 30 to perpendicularly bisect the base leg 23 of the handle member 21, is at least substantially equal to, or at most marginally greater than, the extent of the hook member 22, as determined by the length of the imaginary line 40 between a centroid of the area enclosed by the loop 36 and the intersection of said imaginary line 40 with the extent of the point-bearing region 34. While precise dimensions are not a determinative factor in the design of the device the desired capability of transporting the device 20, in its stored or carrying arrangement, within a clothing pocket infers that the extent of each of the handle member 21 and the hook member 22 is approximately five inches.

It should be clearly noted from the preceding descriptions that the preferred embodiment of the device 20 can assume a plurality of arrangements differing by the relative orientation of the hook member 22 with respect to the orientation of the handle member 21. Of this plurality of arrangements, only two are meaningful in terms of the intended use of the device 20. The first meaningful arrangement is the storage or carrying arrangement, wherein the loop 36 of the hook member 22 is appropriately rotated about the semi-circular arc 30 of the handle member 21 to assume the overlaid arrangement illustrated in FIG. 1 by the ghost image of the hook member 22. The second meaningful arrangement is that assumed during dragging of game, wherein the hock member 22 is deployed, by rotating the loop 36 about the semi-circular arc 30 through substantially 180 degrees of angle, such that the imaginary line 41 bisecting the handle member 21 and the imaginary line 40 extending along the shank region 32 from the loop 36 to intersect the point-bearing region 34 are substantially C aligned, the point-bearing region 34 of the hook member 22 being appropriately impaled into a dead animal and a user grasping and pulling on the base leg 23 of the handle member 21 in a direction away from the animal.

Figure 2:
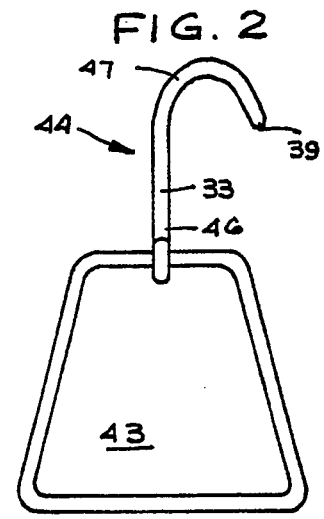
FIG. 2 is a perspective view of a first alternate embodiment of a game device in accordance with the present invention.

Referring next to FIG. 2, a first alternate handle member 42 is formed to be bent so as to enclose a truncated isosceles triangular area 43, with appropriate rounding at vertices between adjacent sides of the geometric figure sod formed. A first alternate configuration of a hook member 44 is formed to have a shank region 46 merging substantially continuously a substantially colinear central extent 33 which extends linearly further to merge with a point-bearing region 47 bent into a substantially continuous arcuate shape, with the point 39 directed, in a dragging arrangement, generally back toward the handle member 42. As with the preferred embodiment, all bends, except the bends forming the loop 36, are in the plane of area 43 enclosed by the handle member 42. The hook member 44 and the handle member 42 mutually overlay to provide a storage or carrying arrangement in a manner equivalent to that of the preferred embodiment.

Figure 3:
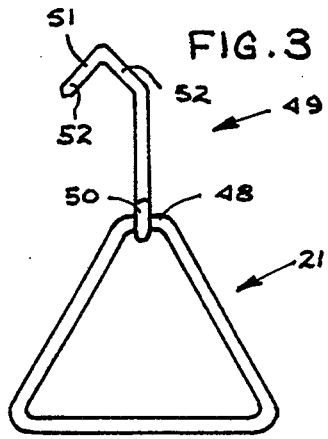
FIG. 3 is a perspective view of a second alternate embodiment of a game drag device in accordance with the present invention.

Referring next to FIG. 3, the handle member 21 of the preferred embodiment illustrated in FIG. 1 is slightly reconfigured to bend the rod-like material into a substantially linear portion 48, in lieu of the semi-circular arc 30 of the preferred embodiment, shown in FIG. 1. A second alternate configuration of a hook member 49 is formed in substantially the manner of the hook member 44 of FIG. 2, except that the several bends are formed as pointedly angular intersections between substantially linear segments. Thus, a loop 50 appears to enclose a substantially trapezoidal area through which the extent of the linear portion 48 of the rod-like material of the handle member 21 passes. Additionally, the arcuate character of the point-bearing region 47 of FIG. 2 is modified to become a point-bearing region 51 comprised of at least two substantially linear segments 52. All other aspects of this second alternate embodiment of the device 20 are equivalent to those established for the preferred embodiment.

Figure 4:
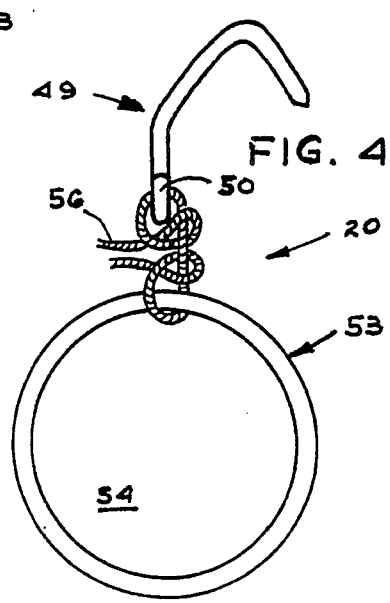
FIG. 4 is a perspective view of a third alternate embodiment of a game drag device in accordance with the present invention.

Referring next to FIG. 4, a handle member 53 represents a third alternate configuration of this component of the device 20. In this configuration, the handle member 53 is bent so as to enclose a substantially circular or oval planar area 54. Separate means are provided for coupling a hook member 49 to the handle member 53, said means taking a first alternate form as a length of cable 56, a first end of which is appropriately knotted, or otherwise secured, to the handle member 53, and the other end of which is appropriately knotted, or otherwise secured, to the loop 50 of the hook member.

Referring next to FIG. 5, a fourth alternate handle member 56 is shown to be substantially similar to the handle member 21 of FIG. 1. A hand grip 57 is formed on, or affixed along, the base leg 23 of the handle member 56. FIG. 5 illustrates the combination of the handle member 56 with the first alternately configured hook member 44 of FIG. 2.

Referring next to FIG. 6, a second alternate means for coupling the hook member 49 to a handle member 21 takes the form of a length of chain 58, having a link at its first end 59 engaged with the loop 50 of the hook member 49, and a link at a second end 60 engaged with a loop 61 of a commonly known spring hitch device 62. A retractable closure 63 of the spring hitch 62 enables a hooked end 64 of the spring hitch 62 to engage around the appropriate region of the handle member 21.

Referring next to FIG. 7, as a third alternate means for coupling the hook member 44 of the handle member 21, a length of rope 66, having an adequate tensile strength, is tied between the loop 36 of the hook member 44 and the semi-circular arc 30 of the handle member 21.

Figure 8:
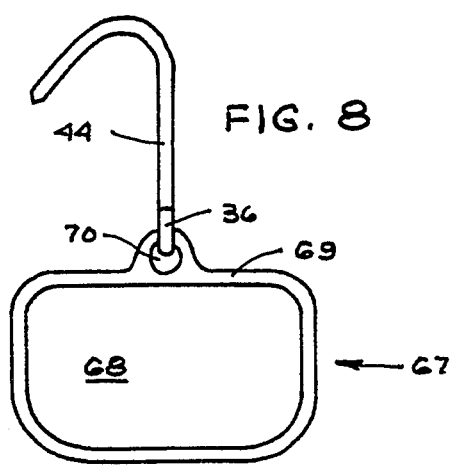
FIG. 8 is a perspective view of a seventh alternate embodiment of a game drag device in accordance with the present invention.

Referring next to FIG. 8, a fifth alternate handle member 67 is fabricated from a bar stock of a durable material to assume a shape enclosing a generally rounded rectangular area 68. Rounding of the area 68 to the shape of an oval is envisioned. The area 68 has a longer dimension adequate for the span of a hand, and a shorter dimension adequate for free passage of a hand thickness therethrough. A first segment 69, representing one of the longer dimension sides of the handle member 67, has a hole 70 formed therethrough adapted to engage with the loop 36 of a hook member 44. In this embodiment, the loop 36 is formed during assembly of the hook member 44 to the handle member 47.

Figure 9:
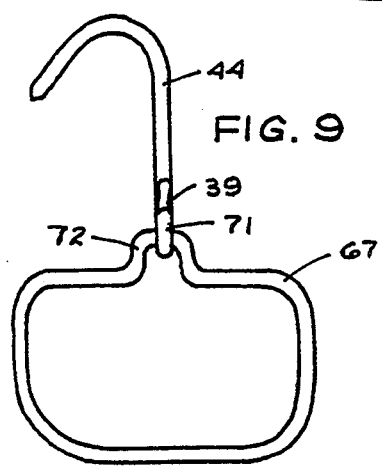
FIG. 9 is a perspective view of an eight alternate embodiment of a game drag device in accordance with the present invention.

Referring next to FIG. 9, a fourth alternative means for coupling a hook member 44 to a handle member 67 is shown to be a single metal lop or link 71 engaging around a bent region 72 of the handle member 67 and passing through the loop 39 of the hook member 44, the bent region 72 being formed on said handle member 67 in lieu of the hole 70 of FIG. 8.

Referring next to FIG. 10, a sixth alternate handle member 73 is configured to enclose a generally hexagonal planar area 74. A second, more substantial, hand grip 76 is shown, along with a hook member 44 and first alternate means for coupling the hook member 44 to the handle member 73, in the form of an appropriately knotted length of cable 56.

Referring lastly to FIG. 11, the handle member 53 of FIG. 4 is illustrated as cooperatively coupled to the hook member 44 of FIG. 2, using the metal link 71 of FIG. 9. The configuration of the hand grip 76 of FIG. 10 is incorporated, with rounding at corners 77.

Referring to the drawing generally, it is envisioned that either of the illustrated handle members, or similar equivalents thereof, may be combined with either of the illustrated hook members, or similar equivalents thereof, using either of the coupling methods illustrated, or any similar method, to form the device 20 in accordance with the present invention. Thus, it should be readily understood that the illustrations provide examples of the several configurations envisioned and do not necessarily represent specific embodiments of the device 20. A plurality of possible embodiments are thus established herein. Any particular embodiment may be found by selecting one of the alternate configurations of the handle member, selecting one of the alternate configurations of the hook member, and coupling them together by one of the alternate coupling means set forth herein.

While the herein above descriptions have disclosed a preferred embodiment of the game drag device in accordance with the present invention, along with equally preferred alternate configurations of each component member of the device, it is to be understood that said descriptions, and the drawings to which they refer, are not to be construed as limited, in any manner, the variability of combinations of component members forming the herein device, nor as excluding additional embodiments, equivalents, modifications, or alternate configurations not set forth explicitly herein. The scope of the present invention is to be construed and limited solely by the claims appended hereto.

I claim

1. A game drag device, comprising:

a handle member, fabricated from a length of rigid durable rod-like material formed generally into a shape of a figure enclosing a substantially planar area, said rod-like material forming a perimeter of said planar area, said area having a first dimension in a plane including said enclosed area at least sufficient to accept a width of a palm of a user hand therethrough and a second dimension, substantially orthogonal, in said plane including said enclosed area, to said first dimension, at least sufficient to accept a thickness of a palm of a user hand therethrough, said figure including a first region of circumferential extent adapted to be grasped by the hand of the user, and a second region of circumferential extent, generally opposite to said first region, said handle member having maximum first and second dimensions limited to enable carrying said handle member in a pocket of the clothing worn by the user;

a hook member, comprising a length of rigid durable rod-like material formed into a shape having a shank region, a loop formed at a first end of said shank region, and a point-bearing region formed at a second end of the shank region, a distal end of said point-bearing region being formed as a point of sufficient acuteness to enable said point-bearing region to penetrate and engage with an appropriate portion of the anatomy of dead game, said hook member having a first dimension, extending from said loop to said point-bearing region, that is substantially equal to, but not greater than, said second dimension of said handle member, said hook member having a second dimension substantially equivalent to the distance that said point-bearing region extends radially outwardly from the shank, said hook member's second dimension being sufficiently less than said first dimension of said handle member such that when the hook member lays flat in an overlapping position with respect to the handle member, with said loop of said hook member disposed substantially at a position of said second region of said handle member and said hook member extending therefrom toward said first region of said handle member, said point-bearing region of said hook member lies within the perimeter of the handle member and is substantially parallelly adjacent said first region of said handle member, with said point of said hook member being shielded from incidental engagement with the anatomy of a user by said first region of said handle member, said overlapping position of said hook member and said handle member defining a storage or carrying arrangement of said game drag device; and means for coupling said loop of said shank of said hook member to said second region of said handle member, said means providing capability that said hook member may be deployed relative to said handle member from said carrying arrangement therebetween to a second arrangement therebetween wherein said point-bearing region of said hook member has been pivoted through substantially 180 degrees of angle describing a cylinder of revolution having said second region of said handle member as an axis of revolution, said hook member extending, when in said second arrangement, substantially within a plane including said enclosed area of said handle member, in a direction away from said second region of said handle member opposed to the direction of said first region of said handle member from said second region of said handle member, said second arrangement defining a use arrangement of said device.

2. A game drag device as claimed in claim 1, wherein said handle member is formed in a shape substantially enclosing a planar area of an isosceles triangle, a base side of said triangle forming said first circumferential region of said handle member, and wherein an apex of an angle included between adjacent equilateral sides of said isosceles triangle is formed into a substantially coplanar semi-circular arc, convex with respect to said enclosed area, forming said second circumferential region of said handle member.

3. A game drag device as claimed in claim 1, wherein said handle member is formed in a shape substantially enclosing a planar area of a truncated isosceles triangle, a base side of said triangle forming said first circumferential region of said handle member, and a truncating side of said triangle forming said second circumferential region of said handle member.

4. A game drag device as claimed in claim 1, wherein said handle member is formed in a shape substantially enclosing a planar area of a truncated isosceles triangle, a base side of said triangle forming said first circumferential region of said handle member, and further comprising a substantially coplanar semi-circular arc, convex with respect to said enclosed area, formed at substantially a mid-point of the extent of said truncating side of a triangle, forming said second circumferential region of said handle member.

5. A game drag device as claimed in claim 1, wherein said handle member is formed in a shape substantially enclosing a planar area of a hexagon, a first circumferential side segment thereof forming said first circumferential region of said handle member, and a parallel opposed circumferential side segment thereof forming said second circumferential region of said handle member.

6. A game drag device as claimed in claim 1, wherein said handle member is formed in a shape substantially enclosing a planar area of a hexagon, a first circumferential side segment thereof forming said first circumferential region of said handle member, and further comprising a substantially coplanar semi-circular arc, convex with respect to said enclosed area, formed at substantially a mid-point of the extent of a parallel opposed circumferential side segment of said hexagon, forming said second circumferential region of said handle member.

7. A game drag device as claimed in claim 1, wherein said handle member is formed in a shape substantially enclosing a planar area that is substantially rectangular, a first circumferential side segment thereof, extending in a longer dimension of said rectangle, forming said first circumferential region of said handle member, and a parallel opposed circumferential side segment, extending in said longer dimension of said rectangle, forming said second circumferential region of said handle member.

8. A game drag device as claimed in claim 1 wherein said handle member is formed in a shape substantially enclosing a planar area that is substantially rectangular, a first circumferential side segment thereof, extending in a longer dimension of said rectangle, forming said first circumferential region of said handle member, and further comprising a hole formed through substantially a mid-point of a parallel opposed circumferential side segment extending in said longer dimension of said rectangle, said hole being perpendicular to a plane including said enclosed area, said hole forming said second circumferential region of said handle member.

9. A game drag device as claimed in claim 1, wherein said handle member is formed in a shape substantially enclosing a planar area that is substantially rectangular, a first circumferential side segment thereof, extending in a longer dimension of said rectangle, forming said first circumferential region of said handle member, and further comprising a substantially coplanar semi-circular arc bend, formed generally at a mid-point of the extent of a parallel opposed circumferential side segment extending in said longer dimension of said rectangle, said bend being convex with respect to said enclosed area, said bend forming said second circumferential region of said handle member.

10. A game drag device as claimed in claim 1, wherein said handle member is formed in a shape substantially enclosing a generally circular planar area, a first circumferential arc portion thereof forming said first circumferential region of said handle member, and a diametrically opposed circumferential arc portion thereof forming said second circumferential region of said handle member.

11. A game drag device as claimed in claim 1, wherein said handle member is formed in a shape substantially enclosing a generally circular planar area, a first circumferential arc portion thereof forming said first circumferential region of said handle member, and further comprising a substantially coplanar semi-circular bend, of a diameter substantially less than a diameter of said enclosed area, formed, convex with respect to said enclosed area, substantially midway along an extent of a diametrically opposed circumferential arc portion of said circular handle member, said semi-circular bend forming said second circumferential region of said handle member.

12. A game drag device as claimed in claim 1, wherein said loop of said hook member is coupled to said second circumferential region of said handle member by passing around said second circumferential region of said handle member.

13. A game drag device as claimed in claim 1, wherein said means for coupling said loop of said hook member to said second circumferential region of said handle member comprises a rope or cable fastened around said loop of said hook member and around said second circumferential region of said handle member.

14. A game drag device as claimed in claim 1, wherein said means for coupling said loop of said hook member to said second circumferential region of said handle member comprises a short length of chain connected at opposite ends to said loop of said hook member and to said second circumferential region of said handle member.

15. A game drag device as claimed in claim 1, wherein said means for coupling said loop of said hook member to said second circumferential region of said handle member comprises a single metallic linking loop, passing through said loop of said hook member and circumferentially around said second circumferential region prior to said handle member.

16. A game drag device as claimed in claim 1, wherein said means for coupling said loop of said hook member to said second circumferential region of said handle member comprises a swivel link assembly having a looped hook at each end thereof attached respectively to said loop of said hook member and to said second circumferential region of said handle member.

17. A game drag device as claimed in claim 1, further comprising a grip member, shaped and adapted for gripping by a user, affixed to and around said first circumferential region of said handle member.

18. A game drag device comprising:
a handle formed in the shape of a loop of rod-like material enclosing a generally planar region of sufficient size to accept the palm of a user's hand therethrough, one side of the handle serving as a hand grip and an opposite side of the handle serving as a point of attachment for a hook member;
a hook member formed of rod-like material and comprising an elongated shank with a hook portion at an outer end thereof, the hook portion having a pointed end angularly disposed from the shank;

attachment means for pivotally mounting the hook member at an inner end thereof on said opposite side of the handle for pivotal movement in a pivot plane perpendicular to the plane of the handle, the hook member being mounted such that the hook portion is positioned or can be positioned in a hook plane perpendicular to the pivot plane, the attachment means permitting pivotal movement of the hook member between closed and open positions, the hook member being folded inwardly to the hand grip when in its closed position, such that the hook member lies flat with respect to the handle and the hook portion is in proximity to the handle grip and the pointed end thereon is shielded by the loop from snagging the user, the hook member extends away from the hand grip when in its open position, such that the pointed end is exposed for attachment to the game being dragged with the game drag;

the size of the hook member in relation to the size of the loop being such that the pointed end of the hook does not extend outwardly beyond the perimeter of the handle so as to pose a snagging problem for the user when the hook member is folded into its closed position.

19. A game drag according to claim 18 wherein the hand grip comprises means for preventing pivotal movement of the hook member past the closed position and through the plane of the loop.

20. A game drag according to claim 19 wherein the hook portion lays against the hand grip when the hook member is in its closed position, the hand grip serving as the means for preventing the hook member from pivoting past the hand grip and through the plane of the loop.

21. A game drag according to claim 18 wherein the handle is formed in the shape of an isosceles triangle, with the hook member being attached to a corner of the triangle formed by the junction of two sides of the triangle of equal length and the hand grip being formed by a triangle side opposite to said junction, the hook portion being formed and disposed with respect to the shank such that the hook portion is substantially parallel to and abuts the hand grip when the hook member is folded into its closed position.

22. A game drag according to claim 21 wherein the handle has an outwardly extending curved portion at the corner of the triangle formed by the junction of the equal sides of the triangle and the shank has a loop at an inner end thereof which lies in a plane perpendicular to the hook plane, the loop on the shank encircling the curved portion of the handle to serve as the attachment means for attaching the hook member to the handle.

23. A game drag according to claim 18 wherein:
the hook portion lies in a plane that includes the axis of rotation of the hook member about the handle; ant the attachment means comprises a loop at an inner end of the shank that is attached to a portion of the handle.

* * * * *